(12) United States Patent
Cross et al.

(10) Patent No.: US 10,716,360 B2
(45) Date of Patent: *Jul. 21, 2020

(54) SOLE STRUCTURE WITH HOLES ARRANGED TO FORM AN AUXETIC STRUCTURE

(71) Applicant: NIKE, Inc., Beaverton, OR (US)

(72) Inventors: Tory M. Cross, Portland, OR (US); Bryan N. Farris, North Plains, OR (US); Elizabeth Langvin, Sherwood, OR (US)

(73) Assignee: NIKE, Inc., Beaverton, OR (US)

( * ) Notice: Subject to any disclaimer, the term of this patent is extended or adjusted under 35 U.S.C. 154(b) by 265 days.

This patent is subject to a terminal disclaimer.

(21) Appl. No.: 15/604,705

(22) Filed: May 25, 2017

(65) Prior Publication Data

US 2017/0258180 A1 Sep. 14, 2017

Related U.S. Application Data

(60) Continuation-in-part of application No. 15/389,844, filed on Dec. 23, 2016, now Pat. No. 10,455,894,
(Continued)

(51) Int. Cl.
*A43B 13/18* (2006.01)
*A43B 13/04* (2006.01)
(Continued)

(52) U.S. Cl.
CPC .......... *A43B 13/187* (2013.01); *A43B 1/0009* (2013.01); *A43B 3/0073* (2013.01);
(Continued)

(58) Field of Classification Search
CPC ... A43B 13/187; A43B 13/188; A43B 13/181; A43B 13/122; A43B 13/14; A43B 13/02;
(Continued)

(56) References Cited

U.S. PATENT DOCUMENTS 4,551,930 A * 11/1985 Graham ................... A43B 5/06
36/114
4,656,760 A * 4/1987 Tonkel ................. A43B 13/181
36/28
(Continued)

FOREIGN PATENT DOCUMENTS

WO 2011146665 A2 11/2011
WO 2016032626 A1 3/2016

*Primary Examiner* — Shaun R Hurley
*Assistant Examiner* — Bao-Thieu L Nguyen
(74) *Attorney, Agent, or Firm* — Quinn IP Law (57) ABSTRACT

A sole structure includes a sole component, which has an inner surface and an outer surface opposite the inner surface. The sole component has a length and a thickness. The sole component includes a sole material, and the sole material has a density. At least one of the thickness or the density varies along the length of the sole component. The sole component defines a plurality of holes extending from at least one of the inner surface and the outer surface and arranged to form an auxetic structure. The auxetic structure is configured such that, when the sole component is tensioned in a first direction, the sole component expands in both the first direction and in a second direction orthogonal to the first direction. A property of the auxetic structure varies as a function of the density or the thickness of the sole component.

31 Claims, 6 Drawing Sheets

Related U.S. Application Data which is a division of application No. 14/643,427, filed on Mar. 10, 2015, now Pat. No. 9,549,590, which is a continuation-in-part of application No. 14/030,002, filed on Sep. 18, 2013, now Pat. No. 9,402,439, and a continuation-in-part of application No. 15/398,750, filed on Jan. 5, 2017, now Pat. No. 10,271,615, which is a continuation of application No. 14/643,121, filed on Mar. 10, 2015, now Pat. No. 9,538,811, which is a continuation-in-part of application No. 14/030,002, filed on Sep. 18, 2013, now Pat. No. 9,402,439.

(51) Int. Cl.

| | | |
|---|---|---|
| *A43B 1/00* | (2006.01) | |
| *A43B 3/00* | (2006.01) | |
| *A43B 5/00* | (2006.01) | |
| *A43B 13/14* | (2006.01) | |
| *A43B 13/12* | (2006.01) | |
| *B29C 44/34* | (2006.01) | |
| *A43B 13/02* | (2006.01) | |
| *B29L 31/50* | (2006.01) | |
| *B29K 19/00* | (2006.01) | |
| *B29K 223/00* | (2006.01) | |

(52) U.S. Cl.
CPC ............... *A43B 5/00* (2013.01); *A43B 13/02* (2013.01); *A43B 13/04* (2013.01); *A43B 13/122* (2013.01); *A43B 13/14* (2013.01); *A43B 13/181* (2013.01); *A43B 13/188* (2013.01); *B29C 44/357* (2013.01); *B29K 2019/00* (2013.01); *B29K 2223/083* (2013.01); *B29L 2031/504* (2013.01)

(58) Field of Classification Search
CPC ............... A43B 1/0009; B29C 44/357; B29K 2223/083; B29K 2019/00; B29L 2031/504
See application file for complete search history.

(56) References Cited

U.S. PATENT DOCUMENTS

| | | | | |
|---|---|---|---|---|
| 6,079,125 A * | 6/2000 | Quellais | ................ | A43B 13/12 36/107 |
| 8,084,117 B2 * | 12/2011 | Lalvani | ................ | B32B 3/266 428/135 |
| 8,186,078 B2 | 5/2012 | Avar et al. | | |
| 9,040,924 B2 * | 5/2015 | Lewellen | ................ | A61B 6/037 250/361 R |
| 9,474,326 B2 * | 10/2016 | Langvin | ................ | A43B 5/00 |
| 9,549,590 B2 * | 1/2017 | Cross | ................ | A43B 13/187 |
| 9,554,620 B2 * | 1/2017 | Cross | ................ | B32B 27/065 |
| 9,781,969 B2 * | 10/2017 | Wright | ................ | A43B 13/14 |
| 9,854,869 B2 * | 1/2018 | Nordstrom | ................ | A43B 13/181 |
| 9,861,158 B2 * | 1/2018 | Cross | ................ | A43B 13/14 |
| 10,206,454 B2 * | 2/2019 | Langvin | ................ | A43B 13/04 |
| 10,206,455 B2 * | 2/2019 | Lawless | ................ | A43B 3/0073 |
| 2005/0166423 A1 * | 8/2005 | Norton | ................ | A43B 13/04 36/28 |
| 2010/0159768 A1 * | 6/2010 | Lee | ................ | B29C 44/357 442/189 |
| 2011/0099842 A1 * | 5/2011 | Burke | ................ | A43B 7/142 36/44 |
| 2014/0101816 A1 | 4/2014 | Toronjo | | |
| 2015/0075033 A1 * | 3/2015 | Cross | ................ | A43B 13/22 36/103 |
| 2015/0133593 A1 * | 5/2015 | Kissell | ................ | C08K 5/175 524/496 |
| 2015/0230548 A1 | 8/2015 | Cross | | |
| 2015/0237957 A1 * | 8/2015 | Cross | ................ | A43B 13/14 36/30 R |
| 2015/0237958 A1 * | 8/2015 | Cross | ................ | A43B 13/181 36/103 |
| 2015/0245683 A1 * | 9/2015 | Cross | ................ | B32B 27/065 36/103 |
| 2015/0245685 A1 * | 9/2015 | Cross | ................ | A43B 13/187 36/104 |
| 2015/0245686 A1 * | 9/2015 | Cross | ................ | A43B 13/02 36/29 |
| 2016/0007681 A1 * | 1/2016 | Langvin | ................ | A43B 5/00 36/103 |
| 2016/0095385 A1 | 4/2016 | Nordstrom | | |
| 2016/0262491 A1 * | 9/2016 | Cross | ................ | A43B 13/14 |
| 2016/0302520 A1 * | 10/2016 | Cross | ................ | A43B 13/22 |
| 2017/0042284 A1 * | 2/2017 | Lawless | ................ | A43B 3/0073 |
| 2017/0042285 A1 * | 2/2017 | Lawless | ................ | A43B 13/181 |
| 2017/0112235 A1 * | 4/2017 | Cross | ................ | A43B 13/02 |
| 2017/0135440 A1 * | 5/2017 | Cross | ................ | A43B 13/22 |
| 2017/0135441 A1 * | 5/2017 | Cross | ................ | A43B 13/14 |
| 2017/0238652 A1 * | 8/2017 | Langvin | ................ | A43B 13/04 |
| 2017/0258178 A1 * | 9/2017 | Cross | ................ | A43B 13/125 |
| 2018/0338572 A1 * | 11/2018 | Cross | ................ | A43B 3/0073 |
| 2018/0338573 A1 * | 11/2018 | Cross | ................ | A43B 13/04 |
| 2018/0338574 A1 * | 11/2018 | Cross | ................ | A43B 13/186 |

* cited by examiner

SOLE STRUCTURE WITH HOLES ARRANGED TO FORM AN AUXETIC STRUCTURE

CROSS-REFERENCE TO RELATED APPLICATIONS

This is a continuation-in-part and claims the benefit of U.S. patent application Ser. No. 15/389,844, filed on Dec. 23, 2016, which is divisional application of U.S. patent application Ser. No. 14/643,427, filed on Mar. 10, 2015, now U.S. Pat. No. 9,549,590, which is a continuation-in-part of U.S. patent application Ser. No. 14/030,002, filed on Sep. 18, 2013, now U.S. Pat. No. 9,402,439. This is also a continuation-in-part and claims the benefit of U.S. patent application Ser. No. 15/398,750, filed on Jan. 5, 2017, which is a continuation of U.S. patent application Ser. No. 14/643,121, filed on Mar. 10, 2015, now U.S. Pat. No. 9,538,811, which is a continuation-in-part of U.S. patent application Ser. No. 14/030,002, filed on Sep. 18, 2013, now U.S. Pat. No. 9,402,439. The entire disclosure of each patent application listed above is incorporated herein by reference.

TECHNICAL FIELD

The present disclosure relates to auxetic structures and, more particularly, to sole structures with holes having an auxetic configuration.

BACKGROUND

Articles of footwear typically have at least two major components, an upper that provides the enclosure for receiving the wearer's foot, and a sole secured to the upper that is the primary contact to the ground or playing surface. The footwear may also use some type of fastening system, for example, laces or straps or a combination of both, to secure the footwear around the wearer's foot. The sole may comprise three layers—an inner sole, a midsole and an outer sole. The outer sole is the primary contact to the ground or the playing surface. The outer sole generally carries a tread pattern and/or cleats or spikes or other protuberances that provide the wearer of the footwear with improved traction suitable to the particular athletic, work or recreational activity, or to a particular ground surface.

DETAILED DESCRIPTION

The present disclosure describes sole structures for an article of footwear. In certain embodiments, A sole structure includes a sole component, which has an inner surface and an outer surface opposite the inner surface. The sole component has a length and a thickness. The sole component includes a sole material, and the sole material has a density. At least one of the thickness or the density varies along the length of the sole component. The sole component defines a plurality of holes extending from at least one of the inner surface and the outer surface and arranged to form an auxetic structure. The auxetic structure is configured such that, when the sole component is tensioned in a first direction, the sole component expands in both the first direction and in a second direction orthogonal to the first direction. A property of the auxetic structure varies as a function of the density or the thickness of the sole component. The article of footwear may be tuned using auxetic structures. With the auxetic structures, the ride, fit, and cushioning across the sole structure can be customized. Such customization is generally not possible when using a monolithic rubber or foam sole. The heel region is configured to absorb energy, while providing lateral stability. The midfoot region can be stiffer than the heel region and/or non-auxetic, because the foot exerts very little contact pressure at the midfoot portion when compared with the heel region. The forefoot region has enough firmness and structure to enable a good/firm push-off without needing to dig out of a mushy cushion.

The sole component includes a forefoot portion, a heel portion, and a midfoot portion disposed between the heel portion and the forefoot portion. The thickness of the sole component may be greater at the heel portion than at the forefoot portion. The thickness of the sole component may be greater at the heel portion than at the midfoot portion. The thickness of the sole component may continuously decrease from the heel portion to the forefoot portion. The thickness of the sole component may decrease linearly from the heel portion to the forefoot portion as a function of the length of the sole component. The sole component may be a midsole component.

The sole component is wholly or partly made of a sole material, such as foam. As a non-limiting example, the sole material includes an ethylene-vinyl acetate (EVA) foam and blown nitrile rubber. The density of the sole material may vary along the length of the sole component. For example, the density of the sole material may be greater at the heel portion than at the forefoot portion. The density of the sole material may be greater at the heel portion than at the midfoot portion. As a non-limiting example, the density of the sole material may continuously decrease from the heel portion to the forefoot portion. For instance, the density of the sole material may decrease linearly from the heel portion to the forefoot portion as a function of the length of the sole component. At least some of holes may be shaped as an isotoxal polygon. At least some of the holes may be shaped as a concave hexagon.

In some embodiments, one or more properties of the auxetic structure may include, but are not limited to, sizes, shape, quantity, spacing, and depth of the holes. The sizes of the plurality of holes may vary as a function of the thickness of the sole component and/or the density of the sole material. The shapes of the holes may vary as a function of the thickness of the sole component and/or the density of the sole material. The quantity of the holes within a predetermined area of the length of the sole component may vary as a function of the thickness of the sole component and/or the density of the sole material. The spacing of the holes may vary as a function of the thickness of the sole component and/or the density of the sole material. The depth of the holes may vary as a function of the thickness of the sole component and/or the density of the sole material.

In other embodiments, the sole structure includes a sole component having an inner surface and an outer surface opposite the inner surface. The sole component has a length extending along a longitudinal direction and a width extending along a lateral direction. The lateral direction is perpendicular to the longitudinal direction. The sole component has a thickness extending along a vertical direction. The vertical direction is perpendicular to the longitudinal direction and the lateral direction. The sole component includes a sole material, and the sole material has a density. The sole component defines a plurality of holes extending from at least one of the inner surface and the outer surface and arranged to form an auxetic structure. The auxetic structure is configured such that, when the sole component is tensioned in one of the longitudinal direction or the lateral direction, the sole component expands in both the longitudinal direction and in the lateral direction. One or more properties of the auxetic structure varies as a function of the density or the thickness of the sole component.

The above features and advantages and other features and advantages of the present teachings are readily apparent from the following detailed description of the best modes for carrying out the teachings when taken in connection with the accompanying drawings.

Figure 1:
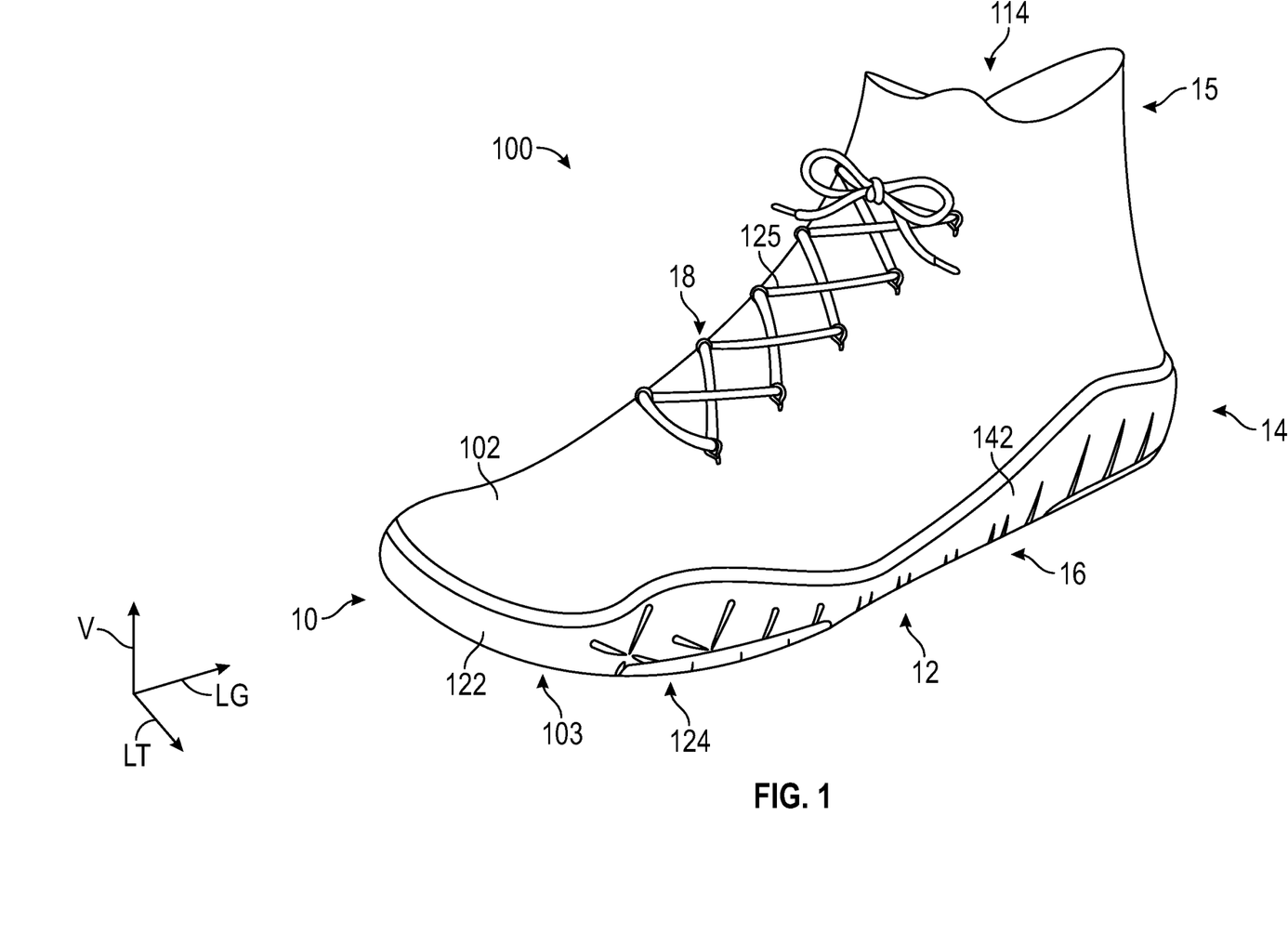
FIG. 1 is an isometric view of an article of footwear.

FIG. 1 is an isometric view of an embodiment of an article of footwear 100. In the exemplary embodiment, the article of footwear 100 has the form of an athletic shoe. However, in other embodiments, the provisions discussed herein for article of footwear 100 could be incorporated into various other kinds of footwear including, but not limited to: basketball shoes, hiking boots, soccer shoes, football shoes, sneakers, running shoes, cross-training shoes, rugby shoes, baseball shoes as well as other kinds of shoes. Moreover, in some embodiments, the provisions discussed herein for article of footwear 100 could be incorporated into various other kinds of non-sports related footwear, including, but not limited to: slippers, sandals, high heeled footwear, and loafers.

For purposes of clarity, the following detailed description discusses the features of article of footwear 100, also referred to simply as article 100. However, it will be understood that other embodiments may incorporate a corresponding article of footwear (e.g., a right article of footwear when article 100 is a left article of footwear) that may share some, and possibly all, of the features of article 100 described herein and shown in the figures.

The embodiments may be characterized by various directional adjectives and reference portions. These directions and reference portions may facilitate in describing the portions of an article of footwear. Moreover, these directions and reference portions may also be used in describing sub-components of an article of footwear (e.g., directions and/or portions of an inner sole component, a midsole component, an outer sole component, an upper or any other components).

For consistency and convenience, directional adjectives are employed throughout this detailed description corresponding to the illustrated embodiments. The term "longitudinal" as used throughout this detailed description and in the claims refers to a direction extending a length of a component (e.g., an upper or sole component). In some cases, the longitudinal direction LG may extend from a forefoot portion to a heel portion of the component. Also, the term "lateral" as used throughout this detailed description and in the claims refers to a direction extending along a width of a component. In other words, the lateral direction LT may extend between a medial side and a lateral side of a component. Furthermore, the term "vertical" as used throughout this detailed description and in the claims refers to a direction generally perpendicular to a lateral and longitudinal direction. For example, in cases where an article is planted flat on a ground surface, the vertical direction V may extend from the ground surface upward. The vertical direction V is perpendicular to the lateral direction LT and the longitudinal direction LG. The lateral direction LT is perpendicular to the longitudinal direction LG. Additionally, the term "inner" refers to a portion of an article disposed closer to an interior of an article, or closer to a foot when the article is worn. Likewise, the term "outer" refers to a portion of an article disposed further from the interior of the article or from the foot. Thus, for example, the inner surface of a component is disposed closer to an interior of the article than the outer surface of the component. This detailed description makes use of these directional adjectives in describing an article and various components of the article, including an upper, a midsole structure and/or an outer sole structure.

The article 100 may be characterized by a number of different regions or portions. For example, the article 100 could include a forefoot portion, a midfoot portion, a heel portion and an ankle portion. Moreover, components of article 100 could likewise comprise corresponding portions. Referring to FIG. 1, article 100 may be divided into an article forefoot portion 10, an article midfoot portion 12 and an article heel portion 14. The article forefoot portion 10 may be generally associated with the toes and joints connecting the metatarsals with the phalanges. The article midfoot portion 12 may be generally associated with the arch of a foot. Likewise, the article heel portion 14 may be generally associated with the heel of a foot, including the calcaneus bone. The article 100 may also include an ankle portion 15 (which may also be referred to as a cuff portion). In addition, the article 100 may include an article lateral side 16 and an article medial side 18. In particular, the article lateral side 16 and the article medial side 18 may be opposing sides of the article 100. Furthermore, both the article lateral side 16 and the article medial side 18 may extend through the article forefoot portion 10, the article midfoot portion 12, the article heel portion 14, and ankle portion 15.

Figure 2:
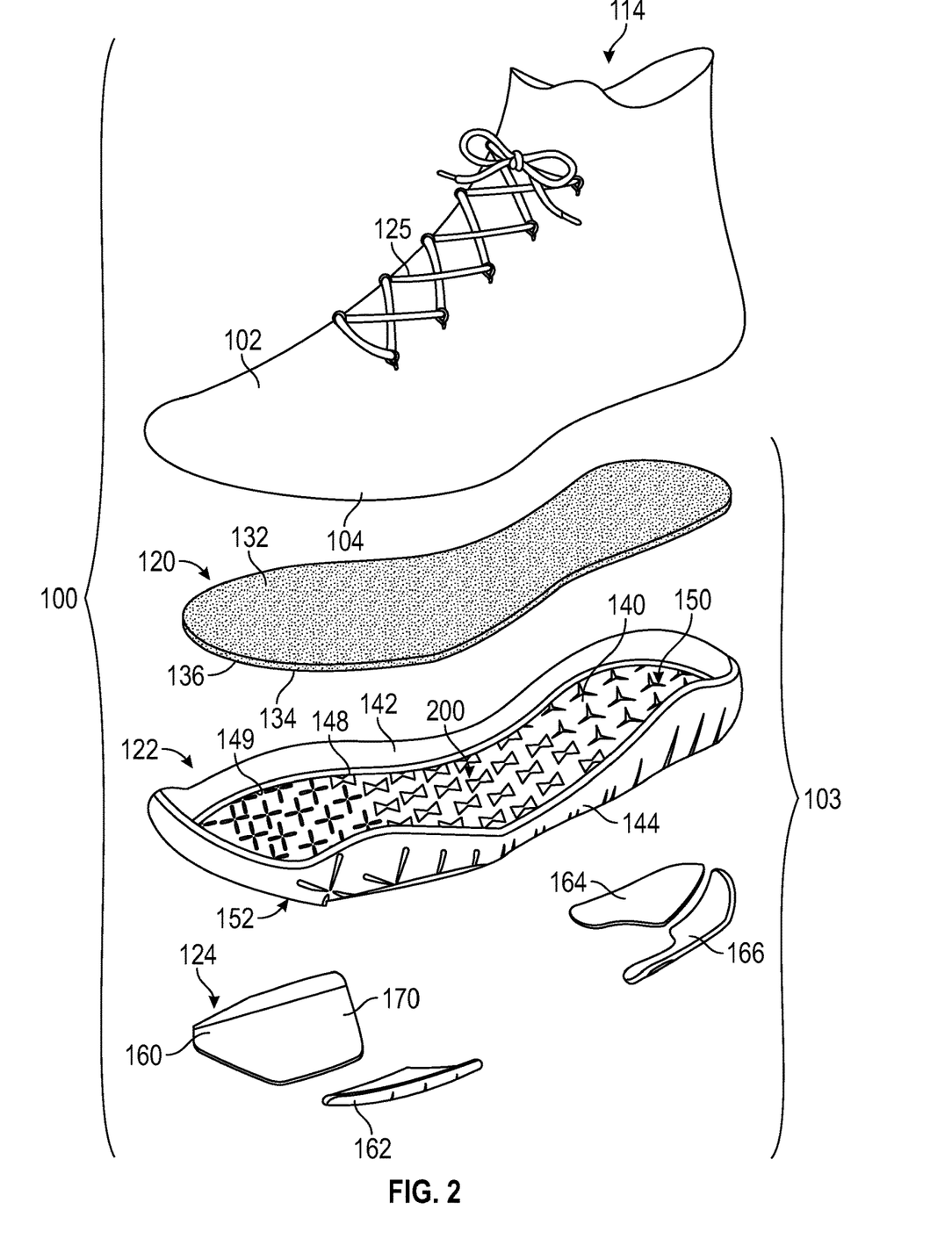
FIG. 2 is an exploded isometric view of the article of footwear shown in FIG. 1, wherein the sole structure includes an inner sole component, a midsole component, and a plurality of outer sole components.

FIG. 2 illustrates an exploded isometric view of an embodiment of article of footwear 100. FIGS. 1-2 illustrate various components of article of footwear 100, including an upper 102 and a sole structure 103.

Generally, the upper 102 may be any type of upper. In particular, the upper 102 may have any design, shape, size and/or color. For example, in embodiments where the article 100 is a basketball shoe, upper 102 could be a high top upper that is shaped to provide high support on an ankle. In embodiments where the article 100 is a running shoe, the upper 102 could be a low top upper.

In some embodiments, the upper 102 includes an ankle opening 114 that provides entry for the foot into an interior cavity of the upper 102. In some embodiments, the upper 102 may also include a tongue (not shown) that provides cushioning and support across the instep of the foot. Some embodiments may include fastening provisions, including, but not limited to: laces, cables, straps, buttons, zippers as well as any other provisions known in the art for fastening articles. In some embodiments, a lace 125 may be applied at a fastening region of upper 102.

Some embodiments may include uppers that extend beneath the foot, thereby providing 360-degree coverage at some regions of the foot. However, other embodiments need not include uppers that extend beneath the foot. In other embodiments, for example, the 102 upper could have a lower periphery joined with a sole structure and/or sock liner.

The upper 102 could be formed from a variety of different manufacturing techniques resulting in various kinds of upper structures. For example, in some embodiments, the upper 102 could have a braided construction, a knitted (e.g., warp-knitted) construction or some other woven construction. In an exemplary embodiment, upper 102 may be a knitted upper.

In some embodiments, the sole structure 103 may be configured to provide traction for the article 100. In addition to providing traction, the sole structure 103 may attenuate ground reaction forces when compressed between the foot and the ground during walking, running or other ambulatory activities. The configuration of the sole structure 103 may vary significantly in different embodiments to include a variety of conventional or non-conventional structures. In some cases, the sole structure 103 can be configured according to one or more types of ground surfaces on which sole structure 103 may be used. Examples of ground surfaces include, but are not limited to: natural turf, synthetic turf, dirt, hardwood flooring, as well as other surfaces.

The sole structure 103 is secured to the upper 102 and extends between the foot and the ground when the article 100 is worn. In different embodiments, the sole structure 103 may include different components. In the exemplary embodiment shown in FIGS. 1-2, the sole structure 103 may include an inner sole component 120, a midsole component 122, and a plurality of outer sole members 124. In some cases, the inner sole component 120 and/or the outer sole members 124 may be optional. In the depicted embodiment, the midsole component 122 is a monolithic (i.e., one-piece) structure. It is envisioned, however, that the midsole component 122 may include two or more interconnected parts. In the present disclosure, the midsole component 122 may be simply referred to as the sole component.

Referring now to FIG. 2, in some embodiments, the inner sole component 120 may be configured as an inner layer for a midsole. For example, as discussed in further detail below, the inner sole component 120 may be integrated, or received, into a portion of the midsole component 122. However, in other embodiments, the inner sole component 120 could function as an insole layer and/or as a strobel layer. Thus, in at least some embodiments, the inner sole component 120 could be joined (e.g., stitched or glued) to a lower portion 104 of the upper 102 for purposes of securing the sole structure 103 to the upper 102.

The inner sole component 120 may have an inner surface 132 and an outer surface 134. The inner surface 132 may generally be oriented towards the upper 102. Outer surface 134 may be generally oriented towards midsole component 122. Furthermore, a peripheral sidewall surface 136 may extend between inner surface 132 and outer surface 134.

The midsole component 122 may be configured to provide cushioning, shock absorption, energy return, support, as well as possibly other provisions. To this end, the midsole component 122 may have a geometry that provides structure and support for the article 100. Specifically, the midsole component 122 may be seen to have a lower portion 140 and a sidewall portion 142. The sidewall portion 142 may extend around the entire periphery 144 of the midsole component 122. As seen in FIG. 1, sidewall portion 142 may partially wrap up the sides of the article 100 to provide increased support along the base of the foot.

The midsole component 122 may further include an inner surface 150 and an outer surface 152 opposite the inner surface 150. The inner surface 150 may be generally oriented towards the upper 102, while the outer surface 152 may be oriented outwardly (i.e., away from the upper 102). Furthermore, in the exemplary embodiment, the midsole component 122 may define a central recess 148 disposed in inner surface 150. The central recess 148 may generally be sized and configured to receive the inner sole component 120.

Figure 3:
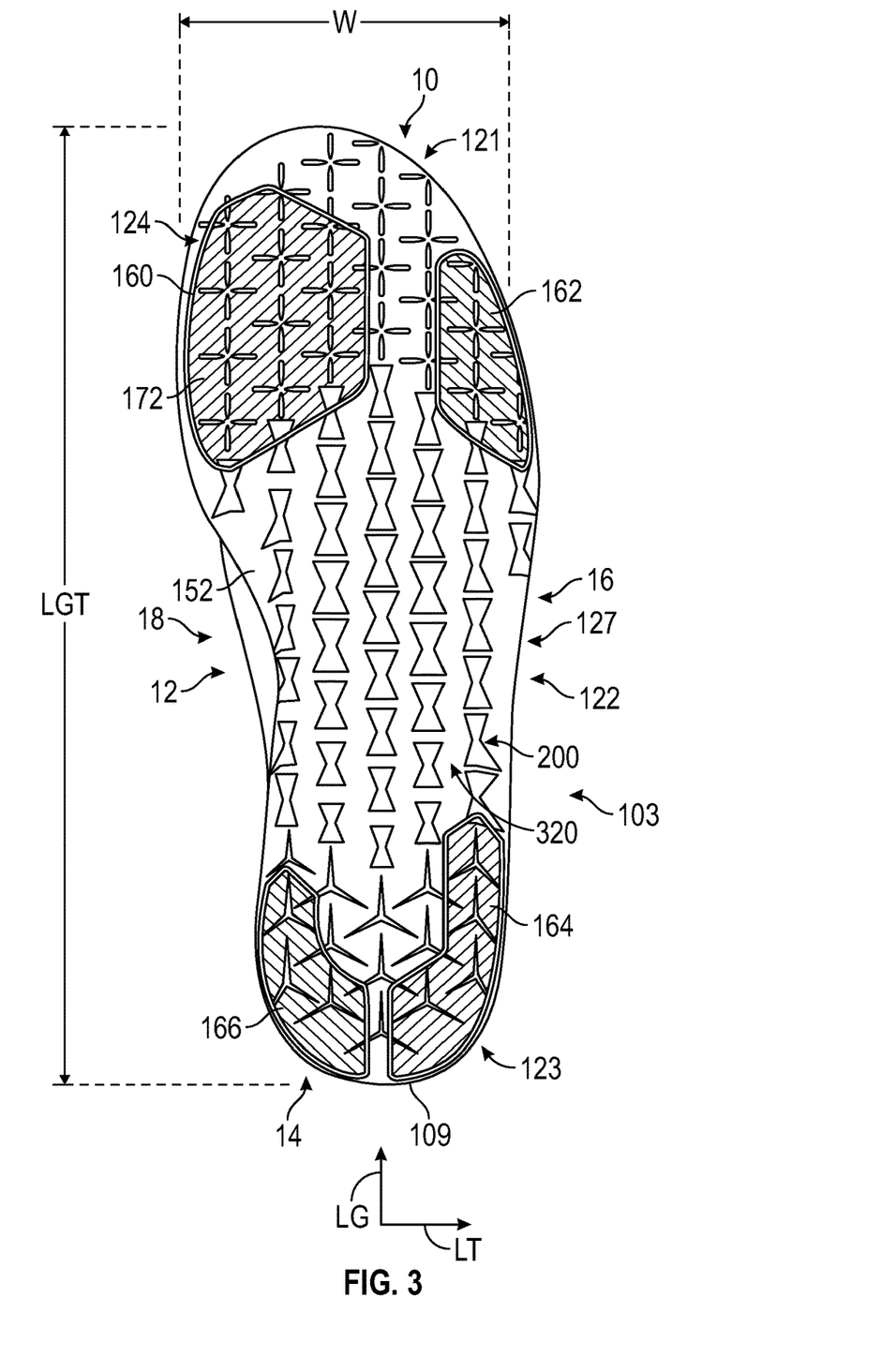
FIG. 3 is a bottom view of the article of footwear shown in FIG. 1.
Figure 4:
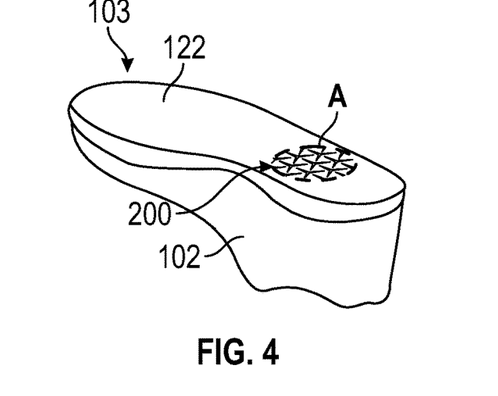
FIG. 4 is a bottom isometric view of the article of footwear shown in FIG. 1.

With reference to FIG. 3, in some embodiments, the midsole component 122 may include a plurality of holes 200, at least some of which may extend through the entire thickness of midsole component 122. In other words, the holes 200 may be blind holes and/or thru-holes. The holes 200 extend from at least one of the inner surface 150 or the outer surface 152. In the exemplary embodiment shown in FIG. 2, some of the holes 200 are visible within central recess 148. The holes 200 of the midsole component 122 arranged to form an auxetic structure. Due to the auxetic configuration of the hole 220, when the midsole component 122 is under longitudinal tension, the midsole component 122 expands in both the longitudinal direction LG and the lateral direction LT, and when the midsole component 122 is under lateral tension, the midsole component 122 expands in both the lateral direction LT and the longitudinal direction LG. The particular size, shape, number, spacing, and depth of the holes 200 in the midsole component 122 impacts the particular response that the holes 200 and the midsole component 122 has to the applied force.

In different embodiments, the midsole component 122 may generally incorporate various provisions associated with midsoles. For example, in one embodiment, a midsole component may be formed from a polymer foam material that attenuates ground reaction forces (i.e., provides cushioning) during walking, running, and other ambulatory activities. In various embodiments, the midsole component 122 may also include fluid-filled chambers, plates, moderators, or other elements that further attenuate forces, enhance stability, or influence the motions of the foot, for example.

FIG. 3 illustrates a bottom view of sole structure 103. As mentioned above, the midsole component 122 may be simply referred to as the sole component. The midsole component 122 includes a sole forefoot portion 121, a sole heel portion 123, and a sole midfoot portion 127 disposed between the sole heel portion 123 and the forefoot portion 121. As a non-limiting example, the sole structure 103 may include four discrete outer sole members 124. Specifically, the sole structure 103 includes a first outer sole member 160, a second outer sole member 162, a third outer sole member 164, and a fourth outer sole member 166. Although the exemplary embodiment includes four different outer sole members 124, other embodiments could include any other number of outer sole members 124. In another embodiment, for example, only a single outer sole member 124 may be present. In still another embodiment, only two outer sole members 124 may be used. In still another embodiment, only three outer sole members 124 could be used. In still other embodiments, five or more outer sole members 124 could be used. In yet other embodiments, the sole structure 103 may not include outer sole members 124.

Generally, any of the outer sole members 124 may be configured as a ground contacting member. In some embodiments, the outer sole member 124 could include properties associated with outsoles, such as durability, wear-resistance and increased traction. In other embodiments, the outer sole member 124 could include properties associated with a midsole, including cushioning, strength and support. In the exemplary embodiment, the outer sole members 124 may be configured as outsole-like members that enhance traction with a ground surface while maintaining wear resistance.

In different embodiments, the locations of one or more outer sole members 124 could vary. In some embodiments, one or more outer sole members 124 could be disposed in the forefoot portion of the sole structure 103. In other embodiments, one or more outer sole members 124 could be disposed in the midfoot portion of a sole structure 103. In still other embodiments, one or more outer sole members could be disposed in a heel portion of a sole structure. In an exemplary embodiment, the first outer sole member 160 and the second outer sole member 162 may be disposed in forefoot portion of sole structure 103. More specifically, the first outer sole member 160 may be disposed on the medial side of the sole structure 103, while the second outer sole member 162 may be disposed on the lateral side of the sole structure 103. In addition, in the exemplary embodiment, the third outer sole member 164 and the fourth outer sole member 166 may be disposed in the heel portion of the sole structure 103. More specifically, the third outer sole member 164 may be disposed on the lateral side of the sole structure 103, and the fourth outer sole member 166 may be disposed on the medial side of the sole structure 103. Furthermore, the first outer sole member 160 and the second outer sole member 162 may be spaced apart from one another in the center of forefoot portion of the sole structure 103, while the third outer sole member 164 and the fourth outer sole member 166 may be spaced apart from one another in the center of the heel portion of the sole structure 103. This exemplary configuration provides outer sole members 124 at areas of increased ground contact during various lateral and medial cuts, so as to enhance traction during these motions.

The sizes of various outer sole members 124 could vary. In the exemplary embodiment, the first outer sole member 160 may be the largest outer sole member 124 of plurality of outer sole members 124. Moreover, second outer sole member 162 may be substantially smaller than first outer sole member 160, thereby enhancing traction more on the medial side of the sole structure 103 than on the lateral side in forefoot portion of the sole structure 103. At the heel portion, the third outer sole member 164 and the fourth outer sole member 166 are both widest along a rearward edge 109 of sole structure 103, and taper slightly towards the midfoot portion of the sole structure 103.

Referring to FIGS. 2 and 3, the first outer sole member 160 may be seen to have an inner surface 170 and an outer surface 172. The inner surface 170 may generally be disposed against the midsole component 122. The outer surface 172 may face outwardly and may be a ground contacting surface. For purposes of clarity, only the inner and outer surfaces of the first outer sole member 160 are indicated in FIGS. 2-3; however, it will be understood that the remaining outer sole members 124 may likewise include corresponding inner and outer surfaces that have similar orientations with respect to the midsole component 122.

In the exemplary embodiment, the inner sole component 120 may be disposed within the central recess 148 of the midsole component 122. More specifically, the outer surface 134 of the inner sole component 120 may be oriented towards, and be in contact with, the inner surface 150 of the midsole component 122. Furthermore, in some cases, a peripheral sidewall surface 136 may also contact inner surface 150 along an inner recess sidewall 149. In addition, the outer sole members 124 may be disposed against the outer surface 152 of the midsole component 122. For example, the inner surface 170 of the first outer sole member 160 may face towards, and be in direct contact with, the outer surface 152 of the midsole component 122. In some embodiments, when assembled, the midsole component 122 and the inner sole component 120 could comprise a composite midsole assembly, or dual layered midsole assembly.

In different embodiments, the upper 102 and the sole structure 103 could be joined in various ways. In some embodiments, the upper 102 could be joined to the inner sole component 120, e.g., using an adhesive or by stitching. In other embodiments, the upper 102 could be joined to the midsole component 122, for example, along the sidewall portion 142. In still other embodiments, the upper 102 could be joined with both the inner sole component 120 and midsole component 122. Moreover, these components may be joined using any methods known in the art for joining sole components with uppers, including various lasting techniques and provisions (e.g., board lasting, slip lasting, etc.).

In different embodiments, the attachment configurations of various components of article 100 could vary. For example, in some embodiments, the inner sole component 120 could be bonded or otherwise attached to midsole component 122. Such bonding or attachment could be accomplished using any known methods for bonding components of articles of footwear, including, but not limited to: adhesives, films, tapes, staples, stitching, or other methods. In some other embodiments, it is contemplated that the inner sole component 120 may not be bonded or attached to the midsole component 122, and instead could be free-floating. In at least some embodiments, the inner sole component 120 may have a friction fit with the central recess 148 of the midsole component 122.

The outer sole members 124 may be likewise be bonded or otherwise attached to the midsole component 122. Such bonding or attachment could be accomplished using any known methods for bonding components of articles of footwear, including, but not limited to: adhesives, films, tapes, staples, stitching, or other methods.

At least some embodiments, two or more of the inner sole component 120, the midsole component 122 and/or the outer sole members 124 could be formed and/or bonded together during a molding process. For example, in some embodiments, upon forming the midsole component 122, the inner sole component 120 could be molded within the central recess 148.

Embodiments can include provisions to facilitate expansion and/or adaptability of a sole structure during dynamic motions. In some embodiments, a sole structure may be configured with auxetic provisions. In particular, one or more components of the sole structure may be capable of undergoing auxetic motions (e.g., expansion and/or contraction).

The sole structure 103 as shown in FIGS. 1-5 and as described further in detail below, has an auxetic structure or configuration. Sole structures comprising auxetic structures are described in Cross, U.S. patent application Ser. No. 14/030,002, filed Sep. 18, 2013, now U.S. Pat. No. 9,402,439, and entitled "Auxetic Structures and Footwear with Soles Having Auxetic Structures" (the "Auxetic Structures application"), the entirety of which is hereby incorporated by reference.

As described in the Auxetic Structures application, auxetic materials have a negative Poisson's ratio, such that when they are under tension in a first direction, their dimensions increase both in the first direction and in a second direction orthogonal or perpendicular to the first direction. This property of an auxetic is illustrated in FIGS. 4-7 and is described below.

With reference to FIGS. 3-7, the midsole component 122 has a length LGT extending along the longitudinal direction LG and a width W extending along the lateral direction LT. As mentioned above, the lateral direction LT is perpendicular to the longitudinal direction LG. As seen in FIG. 3, the sole structure 103 may include a plurality of holes 200. As used herein, the term "hole" refers to any hollowed area or recessed area in a component. In some cases, a hole may be a through hole (i.e., a thru-hole), in which the hole extends between two opposing surfaces of a component. In other cases, a hole may be a blind-hole, in which the hole may not extend through the entire thickness of the component and may therefore only be open on one side. Moreover, as discussed in further detail below, a component may utilize a combination of through holes and blind-holes. Furthermore, the term "hole" may be used interchangeably in some cases with "aperture" or "recess."

In regions including one or more holes, the sole structure 103 may be further associate with a plurality of discrete sole portions 320. Specifically, sole portions 320 comprise the portions of sole structure 103 that extend between plurality of holes 200. It may also be seen that plurality of holes 200 extend between sole portions 320. Thus, it may be understood that each hole may be surrounded by a plurality of sole portions, such that the boundary of each hole may be defined by the edges of the sole portions. This arrangement between holes (or apertures) and sole portions, is discussed in further detail in the Auxetic Structures application.

As seen in FIG. 3, the holes 200 may extend through a majority of the midsole component 122. In some embodiments, plurality of holes 200 may extend through the sole forefoot portion 121, the sole midfoot portion 127, and the sole heel portion 123 of the midsole component 122. For instance, the holes 200 may extend along a majority of the length LGT and the width W of the midsole component 122. In other embodiments, plurality of holes 200 may not extend through each of these portions.

The holes 200 may also extend through plurality of the outer sole members 124. In the exemplary embodiment, each of the first outer sole member 160, the second outer sole member 162, the third outer sole member 164 and the fourth outer sole member 166 includes two or more holes. However, in other embodiments, one or more outer sole members may not include any holes.

In different embodiments, the geometry of one or more holes could vary. Examples of different geometries that could be used for an auxetic sole structure are disclosed in the Auxetic Structures application. Moreover, embodiments could also utilize any other geometries, such as utilizing sole portions with parallelogram geometries or other polygonal geometries that are arranged in a pattern to provide the sole with an auxetic structure. In the exemplary embodiment, some of the holes 200 have a tri-star geometry, including three arms or points extending from a common center. For example, at least some of the holes 200 may be shaped as an isotoxal polygon to provide the midsole component 122 with an auxetic configuration. As a non-limiting example, at least some of holes 200 may be shaped as an auxetic hexagon (i.e., a concave hexagon) to provide polygon to provide the midsole component 122 with an auxetic configuration. At least some of the holes 200 may be shaped as liner slits and arranged in a cross pattern. The shape of the holes 200 may vary as a function of the thickness of the midsole component 122 (or any other sole component) and/or the density of the sole material to optimize sole cushioning. For example, the holes 200 in the sole heel portion 123 may be shaped as an isotoxal polygon, the holes 200 in the sole midfoot portion 127 may be shaped as an auxetic hexagon (i.e., a concave hexagon), and the holes 200 in the sole forefoot portion 121 may be shaped as liner slits and arranged in a cross pattern.

The geometry of one or more sole portions could also vary. Examples of different geometries that could be used for an auxetic sole structure are disclosed in the Auxetic Structures application. It may be understood that the geometry of a sole portion may be determined by the geometry of the holes in an auxetic pattern, and vice versa. In the exemplary embodiment, each sole portion has an approximately triangular geometry.

The holes 200 may be arranged on sole structure 103 in an auxetic pattern, or auxetic configuration. In other words, the holes 200 are arranged to form an auxetic structure. Therefore, the holes 200 may be arranged on the midsole component 122 and/or outer sole members 124 in a manner that allows those components to undergo auxetic motions, such as expansion or contraction. An example of auxetic expansion, which occurs as the result of the auxetic configuration of plurality of holes 200, is shown in FIGS. 4-7. Initially, in FIGS. 4 and 5, the sole structure 103 is in a non-tensioned state. In this state, the holes 200 have an un-tensioned area. For purposes of illustration, only a region 400 of midsole component 122 is shown, where region 400 includes a subset of holes 200.

Figure 5:
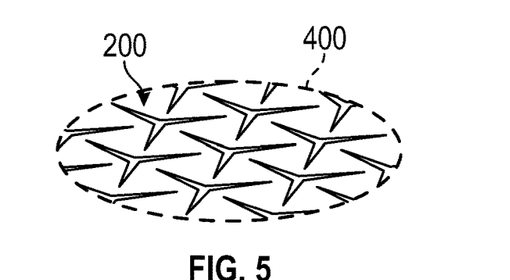
FIG. 5 is an isometric enlarged view of the sole structure, taken around area A of FIG. 4.
Figure 6:
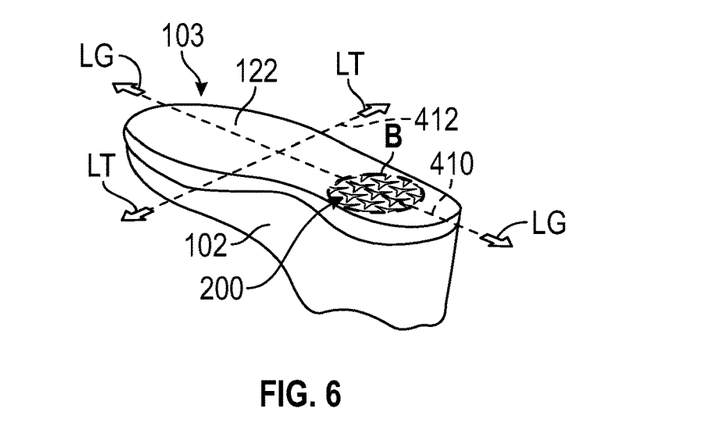
FIG. 6 is a bottom isometric view of the article of footwear shown in FIG. 1, depicting the sole structure undergoing auxetic expansion.
Figure 7:
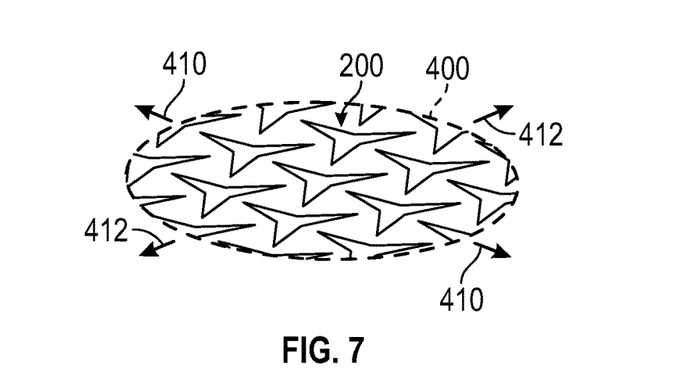
FIG. 7 is an isometric enlarged view of the sole component, taken around area B of FIG. 6.
Figure 8:
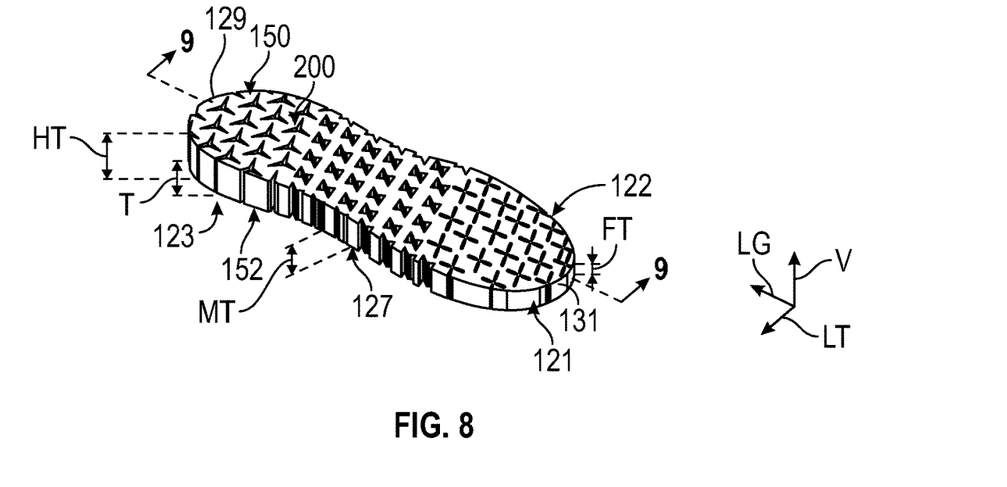
FIG. 8 is an isometric view of a sole component of a sole structure according to an embodiment of the present disclosure.

As tension is applied across the sole structure 103 along an exemplary linear direction 410 (e.g., a longitudinal direction LG), as shown in FIGS. 6 and 7, the sole structure 103 undergoes auxetic expansion. That is, the sole structure 103 expands along direction 410, as well as in a second direction 412 (e.g., the lateral direction LT) that is perpendicular to direction 410. In FIG. 5, the representative region 400 is seen to expand in both directions 410 and direction 412 (e.g., the longitudinal direction LG and the lateral direction LT) simultaneously, as the holes 200 increase in size.

Embodiments can include provisions for varying the degree to which some portions of a sole structure (including portions of a midsole component and/or outer sole members) may undergo auxetic expansion. Because expansion of the sole structure may result in increased surface contact and/or increased flexibility for regions of the sole structure, varying the degree to which different regions or portions expand (or contract) under tension (or compression) may allow the traction properties and/or flexibility of those different regions to be tuned. Varying the degree to which a midsole component undergoes auxetic expansion can be achieved by varying the properties of different openings. For example, embodiments of a midsole component may include some through holes and some blind holes, as through holes may generally expand more (relative to their initial configuration) than blind holes during auxetic motions.

With reference to FIGS. 8-11, the midsole component 122 has a thickness T extending along a vertical direction V. The thickness T of the midsole component 122 is defined from the inner surface 150 to the outer surface 152 of the midsole component 122. As discussed above, the vertical direction V is perpendicular to the lateral direction LT and the longitudinal direction LG. The thickness T of the midsole component 122 varies along the length LGT of the midsole component 122 to provide different applied force responses in different regions along the length LGT of the midsole component 122. In other words, the thickness T of the midsole component 122 varies along the longitudinal direction LG to provide different applied force responses in different regions along the longitudinal direction LG. Injection molding or 3D printing may be used to manufacture the midsole component 122 with varying thickness. In order to provide optimal cushioning, the holes 200 and its corresponding auxetic configuration may be matched to the thickness T of the midsole component 122. For instance, the holes 200 (and the corresponding auxetic configuration) in a relatively thick region of the midsole component 122 may be different than the holes 200 (and the corresponding auxetic configuration) in a relatively thin region of the midsole component 122.

As a non-limiting example, the thickness T of the midsole component 122 may be greater at the sole heel portion 123 than at the sole forefoot portion 121. Specifically, the sole heel portion 123 may have a heel thickness HT defined from the inner surface 150 to the outer surface 152, and the sole forefoot portion 121 has a forefoot thickness FT defined from the inner surface 150 to the outer surface 152. The heel thickness HT is greater than the forefoot thickness FT in order to provide optimal cushioning for a hard heel striker. The holes 200 of the midsole component 122 arranged in an auxetic configuration.

The stability of the hard heel striker may be maximized by matching the relatively thick sole heel portion 123 with a particular type of auxetic configuration of the holes 200. The thickness T of the midsole component 122 may be greater at the sole heel portion 123 than at the midfoot portion 127. The sole midfoot portion 127 has a midsole thickness MT defined from the inner surface 150 to the outer surface 152. The heel thickness HT may be greater than midsole thickness MT in order to maximize cushioning at the sole heel portion 123 and maximizing comfort during a runner stride. The heel thickness HT may be greater than the midsole thickness and the forefoot thickness FT in order to maximize comfort during the entire heel-to-toe stride. For example, the thickness T of the midsole component 122 may continuously decrease from the sole heel portion 123 to the sole forefoot portion 121 to provide optimal cushioning while enhancing the energy return at the sole forefoot portion 121. For instance, the sole heel portion 123 may have a maximum sole thickness MXT at a rearmost extent 129 of the midsole component 122, and the sole forefoot portion 121 may have a minimum sole thickness MNT at a forwardmost extent 131 of the midsole component 122. The maximum sole thickness MXT may range between fifteen (15) millimeters and ten (10) millimeters, and the minimum sole thickness MNT may range between the ten (10) millimeters and five (5) millimeters. These thickness ranges provide optimal cushioning at the sole heel portion 127 while enhancing the energy return at the sole forefoot portion 121. As graphically illustrated in FIG. 10, the thickness T of the midsole component 122 may decrease linearly from the sole heel portion 123 to the sole forefoot portion 121 as a function of the length LGT of the midsole component 122 to optimize sole cushioning.

Figure 9:
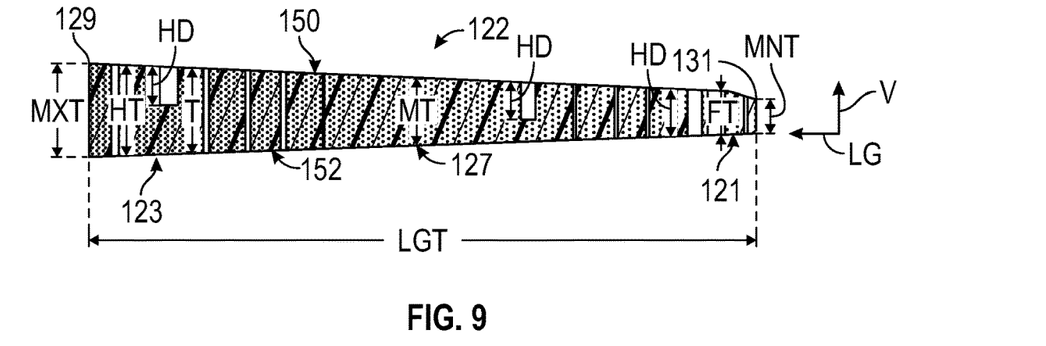
FIG. 9 is a sectional view of the sole component, taken along section line 9-9 of FIG. 8.
Figure 10:
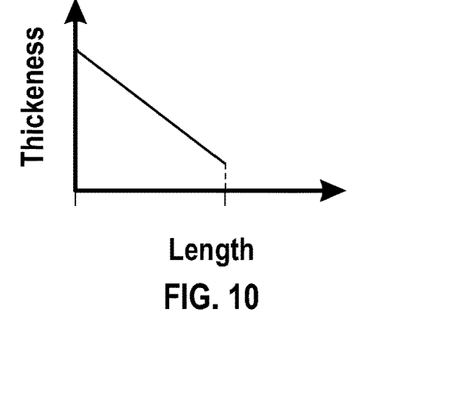
FIG. 10 is a graph illustrating the relationship between the thickness and the length of the sole component.
Figure 11:
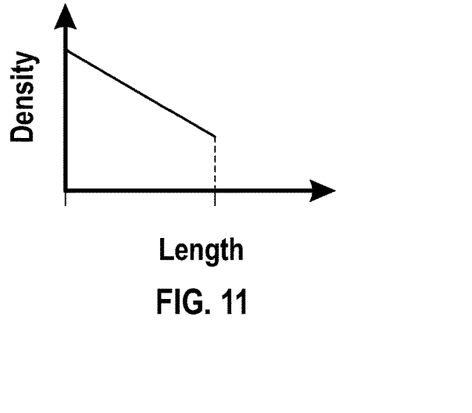
FIG. 11 is a graph illustrating the relationship between the density of the sole material and the length of the sole structure.

In addition to the thickness T of the midsole component, the density of the material forming the midsole component 122 (i.e., the sole material) may vary along the length LGT of the midsole component 122. Injection molding or 3D printing may be used to manufacture the midsole component 122 with varying density. In FIG. 9, the different concentration of speckles along the length LGT of the midsole component 122 illustrates the different densities of the material forming the midsole component 122. The material (partly or wholly) forming the midsole component 122 may be referred to as the sole material. As a non-limiting example, the sole material may be (or may include) an ethylene-vinyl acetate (EVA) foam and blown nitrile rubber. The density of the sole material may be greater at the sole heel portion 123 than at the sole forefoot portion 121. The stability of the hard heel striker may be optimized by maximizing the density of the midsole component 122 at the sole heel portion 123. Further, further stability optimization is possible by maximizing the density and the thickness of the midsole component 122 at the sole heel portion 123. The density of the sole material may be greater at the sole heel portion 127 than at the sole midfoot portion 127 in order to maximize cushioning at the sole heel portion 123 and maximizing comfort during a runner stride. The density of the sole material at the sole heel portion 123 may be greater than the density of the sole material at the sole midfoot portion 127 and the sole forefoot portion 121 in order to maximize comfort during the entire heel-to-toe stride. For example, the density of the sole material may continuously decrease from the sole heel portion 123 to the sole forefoot portion 121 to provide optimal cushioning while enhancing the energy return at the sole forefoot portion 121. The specific gravity of the sole material may range of the midsole component 122 between 0.15 and 0.3 along the length LGT of the midsole component 122. In the present disclosure, the term "specific gravity" means the ratio of the density of the sole material to the density of water. As a non-limiting example, the specific gravity of the sole material at the sole heel portion 123 may range between the 0.3 and 0.25, and the specific gravity of the sole material of the midsole component 122 at the sole forefoot portion 121 may range between 0.15 and 0.2. These specific gravity ranges provide optimal cushioning at the sole heel portion 123 while enhancing the energy return at the sole forefoot portion 121. As graphically illustrated in FIG. 11, the density of the sole material may decrease linearly from the sole heel portion 123 to the sole forefoot portion 121 as a function of the length LGT of the midsole component 122 to optimize sole cushioning. It is contemplated that the midsole component 122 may have a varying thickness T and/or density along its length LGT.

The sole material may wholly or partly be a foam material as described, for example, in U.S. Pat. No. 7,941,938, which patent is entirely incorporated herein by reference. This foam material may have a lightweight, spongy feel. The resiliency of the foam material for the sole material may be greater than 40%, greater than 45%, at least 50%, and in one aspect from 50-70%. Compression set may be 60% or less, 50% or less, 45% or less, and in some instances, within the range of 20 to 60%. The hardness (Durometer Asker C) of the foam material may be, for example, 25 to 50, 25 to 45, 25 to 35, or 35 to 45, e.g., depending on the type of footwear. The tensile strength of the foam material may be at least 15 kg/cm2, and typically 15 to 40 kg/cm2. The elongation % is 150 to 500, typically above 250. The tear strength is 6-15 kg/cm, typically above 7. The sole material may have lower energy loss and may be more lightweight than traditional EVA foams. As additional examples, if desired, at least some portion of midsole component 122 may be made from foam materials used in the LUNAR family of footwear products available from NIKE, Inc. of Beaverton, Oreg. The properties (including ranges) of the foam material for any of the sole components described in this disclose enhances the support provided by sole structure 103 to the wearer's foot without compromising the auxetic properties of the sole structure 103.

Figure 12:
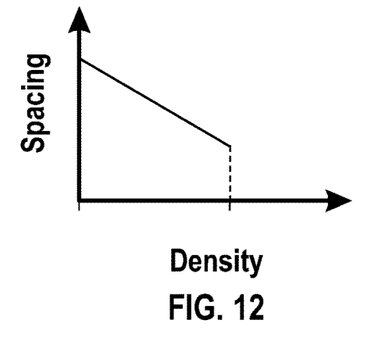
FIG. 12 is a graph illustrating the relationship between the density of the sole material and the spacing between the holes in the sole component.

With reference to FIG. 12, as discussed above, the holes 200 are arranged to form an auxetic structure. One or more of the properties of the auxetic structure may be a function of the thickness T of the midsole component 122 and/or the density of the sole material. The properties of the auxetic structure may be referred to herein as "auxetic properties." The auxetic properties includes, but is not limited to, sizes, shape, quantity, spacing, and depth of the holes 200. As shown in FIG. 12, the spacing between the holes 200 may vary as a function of the density of the sole material to optimize sole cushioning. As used herein, the term "spacing between the holes" means the maximum distance two or more adjacent holes 200. The density of the sole material may be proportional to the spacing between the holes 200. For example, as discussed below, the spacing between the holes 200 decrease as the density of the sole material increases along the length LGT of the midsole component 122 (or any of the sole component). Thus, in this example, the spacing between the holes 200 may increase from the sole forefoot portion 121 (FIG. 9) toward the sole heel portion 123 (FIG. 9) as the density of the sole material may increases from the sole forefoot portion 121 (FIG. 9) toward the sole heel portion 123 (FIG. 9).

Figure 13:
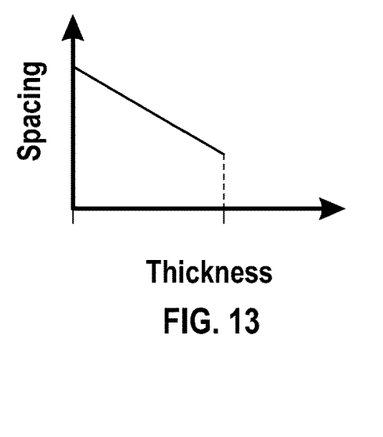
FIG. 13 is a graph illustrating the relationship between the thickness of the sole component and the spacing between the holes in the sole component.

With reference to FIG. 13, the spacing between the holes 200 may vary as a function of the thickness T of the midsole component 122 (or any of the sole components) to optimize sole cushioning. The thickness T of the midsole component 122 (or any of the sole components) may be inversely proportional to the spacing between the holes 200. For example, as discussed below, the spacing between the holes 200 decreases from the sole heel portion 123 (FIG. 9) toward the sole forefoot portion 121 (FIG. 9) as the thickness T of the sole material increases along the length LGT of the midsole component 122 (or any of the sole component) from the sole forefoot portion 121 (FIG. 9) to the sole heel portion 123 (FIG. 9).

Figure 14:
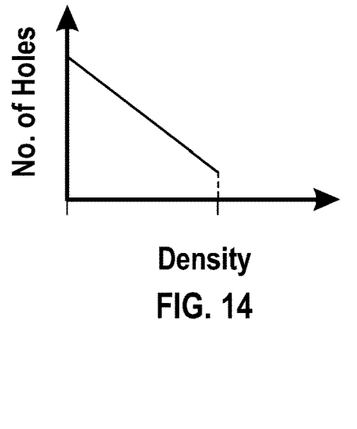
FIG. 14 is a graph illustrating the relationship between the density of the sole material and the number of holes in the sole component.

With reference to FIG. 14, quantity of the holes 200 may vary as a function of the density of the sole material to optimize sole cushioning. As used herein, the term "quantity of the holes" means the number of holes 200 within a predetermined area of the midsole component 122 (or any other sole component). The density of the sole material may be directly proportional to the quantity of the holes 200. For example, as discussed below, the quantity of the holes 200 decreases as the density of the sole material increases along the length LGT of the midsole component 122 (or any of the sole component). Thus, in this example, the quantity of holes 200 may decrease from the sole heel portion 123 (FIG. 9) toward the sole forefoot portion 121 (FIG. 9) as the density of the sole material decreases from the sole heel portion 123 (FIG. 9) toward the sole forefoot portion 121).

Figure 15:
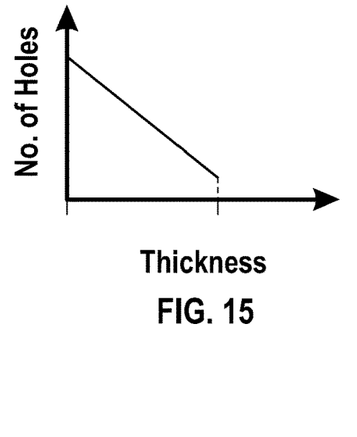
FIG. 15 is a graph illustrating the relationship between the thickness of the sole component and the number of holes in the sole component.

With reference to FIG. 15, the quantity of holes 200 may vary as a function of the thickness T of the midsole component 122 (or any of the sole components) to optimize sole cushioning. The thickness T of the midsole component 122 (or any of the sole components) may be inversely proportional to the quantity of holes 200. For example, as discussed below, the quantity of holes 200 decreases as the thickness T of the midsole component 122 (or any of the sole component) increases along the length LGT of the midsole component 122 (or any of the sole component). Thus, in this example, the quantity of holes 200 may decrease from the sole heel portion 123 (FIG. 9) toward the sole forefoot portion 121 (FIG. 9) as the thickness T of the midsole component 122 (or any of the sole components) decreases from the sole heel portion 123 (FIG. 9) toward the sole forefoot portion 121 (FIG. 9).

Figure 16:
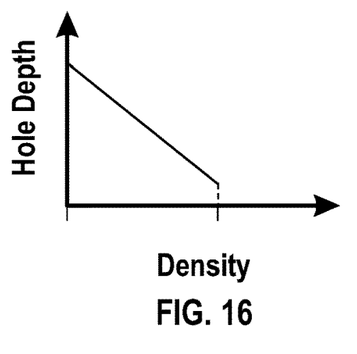
FIG. 16 is a graph illustrating the relationship between the hole depth and the density of the sole material.

With reference to FIG. 16, depth of the holes 200 (i.e., the hole depth HD as shown in FIG. 9) may vary as a function of the density of the sole material to optimize sole cushioning. The density of the sole material may be proportional to the hole depth HD (FIG. 9) of the holes 200. For example, as discussed below, the hole depth HD (FIG. 9) of the holes 200 decreases as the density of the sole material decreases along the length LGT of the midsole component 122 (or any of the sole component). Thus, in this example, the hole depth HD (FIG. 9) of holes 200 may increase from the sole heel portion 123 (FIG. 9) toward the sole forefoot portion 121 (FIG. 9) as the density of the sole material increases from the sole heel portion 123 (FIG. 9) toward the sole forefoot portion 121).

Figure 17:
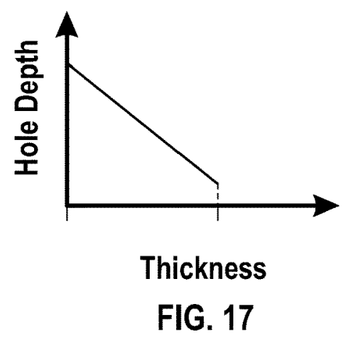
FIG. 17 is a graph illustrating the relationship between the hole depth and the thickness of the sole component.

With reference to FIG. 17, the hole depth HD (FIG. 9) of holes 200 may vary as a function of the thickness T of the midsole component 122 (or any of the sole components) to optimize sole cushioning. The thickness T of the midsole component 122 (or any of the sole components) may be proportional to the hole depth HD (FIG. 9) of the holes 200. For example, as discussed below, the hole depth HD (FIG. 9) of holes 200 decreases from the sole heel portion 123 (FIG. 9) toward the sole forefoot portion 121 as the thickness T of the midsole component 122 (or any of the sole component) decreases along the length LGT of the midsole component 122 from the sole heel portion 123 (FIG. 9) toward the sole forefoot portion 121 (FIG. 9).

While the best modes for carrying out the teachings have been described in detail, those familiar with the art to which this disclosure relates will recognize various alternative designs and embodiments for practicing the teachings within the scope of the appended claims. The article of footwear 100 illustratively disclosed herein may be suitably practiced in the absence of any element which is not specifically disclosed herein. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings.

The invention claimed is:

1. A sole structure for an article of footwear, comprising:
a sole component having an inner surface and an outer surface opposite the inner surface a forefoot portion, a heel portion, and a midfoot portion disposed between the heel portion and the forefoot portion, wherein the sole component has a length and a thickness, the sole component is at least partly formed from a polymeric sole material having a density;
wherein at least one of the thickness of the sole component or the density of the polymeric sole inateri al varies along the length of the sole component and wherein the thickness and density are greater in the heel portion than in the forefoot portion;
wherein the sole component defines a plurality of holes extending from at least one of the inner surface and the outer surface and arranged to form an auxetic structure;
wherein the auxetic structure is configured such that when the sole component is tensioned in a first direction, the sole component expands in both the first direction and in a second direction orthogonal to the first direction;
wherein a property of the auxetic structure varies as a function of the varying density of the polymeric sole material or the thickness of the sole component, the property of the auxetic structure being at least one of an undeformed size, an undeformed shape, a quantity, a spacing, or a depth of the plurality of holes; and
wherein the sole component is a midsole.

2. The sole structure according to claim 1, wherein the thickness of the sole component is greater at the heel portion than at the midfoot portion.

3. The sole structure according to claim 1, wherein the thickness of the sole component continuously decreases from the heel portion to the forefoot portion.

4. The sole structure according to claim 1, wherein the thickness of the sole component decreases linearly from the heel portion to the forefoot portion as a function of the length of the sole component.

5. The sole structure according to claim 1, wherein the sole material includes an ethylene-vinyl acetate (EVA) foam and blown nitrile rubber.

6. The sole structure according to claim 1, wherein the sole component includes a forefoot portion, a heel portion, and a midfoot portion disposed between the heel portion and the forefoot portion, and the density of the sole material is greater at the heel portion than at the forefoot portion.

7. The sole structure according to claim 6, wherein the density of the sole material is greater at the heel portion than at the midfoot portion.

8. The sole structure according to claim 7, wherein the density of the sole material continuously decreases from the heel portion to the forefoot portion.

9. The sole structure according to claim 8, wherein the density of the sole material decreases linearly from the heel portion to the forefoot portion as a function of the length of the sole structure.

10. The sole structure according to claim 1, wherein at least some of the plurality of holes are shaped as an isotoxal polygon.

11. The sole structure according to claim 1, wherein at least some of the plurality of holes are shaped as a concave hexagon.

12. The sole structure according to claim 1, wherein the property of the auxetic structure includes sizes of the plurality of holes, and the sizes of the plurality of holes vary as a function of the density or the thickness of the sole component.

13. The sole structure according to claim 12, wherein the property of the auxetic structure includes shapes of the plurality of holes, and the shapes of the plurality of holes varies as a function of the density or the thickness of the sole component.

14. The sole structure according to claim 13, wherein the property of the auxetic structure includes a quantity of the plurality of holes within an area of the length of the sole component, and the quantity of the plurality of holes varies as a function of the density or the thickness of the sole component.

15. The sole structure according to claim 14, wherein the property of the auxetic structure includes a spacing of the plurality of holes, and the spacing of the plurality of holes varies as a function of the density or the thickness of the sole component.

16. The sole structure according to claim 15, wherein property of the auxetic structure includes a depth of the plurality of holes, and the depth of the plurality of holes varies as a function of the density or the thickness of the sole component.

17. A sole structure for an article of footwear, comprising:
a sole component having an inner surface and an outer surface opposite the inner surface, wherein the sole component has a length extending along a longitudinal direction, the sole component has a width extending along a lateral direction, the lateral direction is perpendicular to the longitudinal direction, the sole component having a forefoot portion, a heel portion, and a midfoot portion disposed between the heel portion and the forefoot portion, the sole component further having a thickness extending along a vertical direction, the vertical direction is perpendicular to the longitudinal direction and the lateral direction, the sole component is at least partly formed from a polymeric sole material having a density, and wherein the thickness and density are greater in the heel portion than in the forefoot portion;
wherein the sole component defines a plurality of holes extending from at least one of the inner surface and the outer surface and arranged to form an auxetic structure;
wherein the auxetic structure is configured such that when the sole component is tensioned in one of the longitudinal direction or the lateral direction, the sole component expands in both the longitudinal direction and in the lateral direction;
wherein a property of the auxetic structure across the sole component varies as a function of the density of the polymeric sole material or the thickness of the sole component, the property of the auxetic structure being at least one of an undeformed size, an undeformed shape, a quantity, a spacing, or a depth of the plurality of holes; and
wherein the sole component is a midsole.

18. The sole structure according to claim 17, wherein the density of the sole material is greater at the heel portion than at the midfoot portion.

19. The sole structure according to claim 18, wherein the density of the sole material continuously decreases from the heel portion to the forefoot portion.

20. The sole structure according to claim 19, wherein the density of the sole material decreases linearly from the heel portion to the forefoot portion as a function of the length of the sole component.

21. The sole structure according to claim 20, wherein the sole material includes an ethylene-vinyl acetate (EVA) foam and blown nitrile rubber.

22. The sole structure according to claim 17, wherein the thickness of the sole material is greater at the heel portion than at the midfoot portion.

23. The sole structure according to claim 22, wherein the thickness of the sole material continuously decreases from the heel portion to the forefoot portion.

24. The sole structure according to claim 5, wherein the thickness of the sole material decreases linearly from the heel portion to the forefoot portion as a function of the length of the sole component.

25. The sole structure according to claim 17, wherein at least some of the plurality of holes are shaped as an isotoxal polygon.

26. The sole structure according to claim 17, wherein at least some of the plurality of holes are shaped as a concave hexagon.

27. The sole structure according to claim 17, wherein the property of the auxetic structure includes sizes of the plurality of holes, and the sizes of the plurality of holes vary as a function of the density or the thickness of the sole component.

28. The sole structure according to claim 17, wherein the property of the auxetic structure includes shapes of the plurality of holes, and the shapes of the plurality of holes varies as a function of the density of the sole component.

29. The sole structure according to claim 17, wherein the property of the auxetic structure includes a quantity of the plurality of holes within an area of the length of the sole component, and the quantity of the plurality of holes varies as a function of the density or the thickness of the sole component.

30. The sole structure according to claim 17, wherein the property of the auxetic structure includes a spacing of the plurality of holes, and the spacing of the plurality of holes varies as a function of the density or the thickness of the sole component.

31. The sole structure according to claim 17, wherein property of the auxetic structure includes a depth of the plurality of holes, and the depth of the plurality of holes varies as a function of the density or the thickness of the sole component.

* * * * *